Sept. 2, 1930.   E. F. LEMOINE   1,775,042
SEPARABLE FASTENER
Filed Jan. 29, 1926

Inventor:
Emile F. Lemoine,
Attys

Patented Sept. 2, 1930

1,775,042

UNITED STATES PATENT OFFICE

EMILE F. LEMOINE, OF AMESBURY, MASSACHUSETTS, ASSIGNOR TO G. W. J. MURPHY COMPANY, OF AMESBURY, MASSACHUSETTS, A CORPORATION OF MASSACHUSETTS

SEPARABLE FASTENER

Application filed January 29, 1926. Serial No. 84,606.

The object of the present invention is to provide an improved construction of separable fastener which may be mounted in a simple and secure manner on a supporting member. The invention finds a particular application to fastening elements which are mounted on thin, rigid members such, for example, as the metal body panels of automobiles, and by way of an example thereof I will herein disclose a socket member mounted on such a panel and adapted to cooperate with a male member mounted on the automobile curtain.

The construction of the illustrative embodiment of my invention referred to will be clear from the following description thereof taken in connection with the accompanying drawings, wherein.

Figure 1:
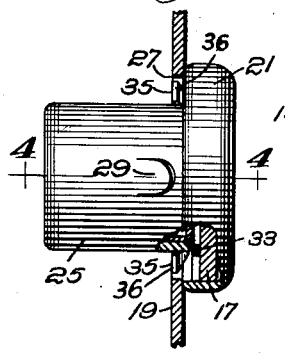
Fig. 1 is a side elevation of a fastener socket member in place in a wall, with part in section.
Figure 3:
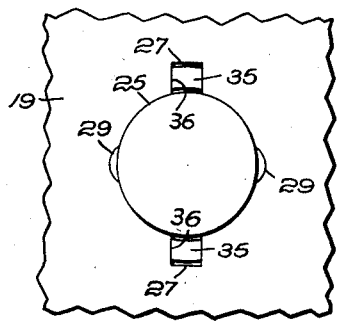
Fig. 3 is a rear elevation thereof, as seen from the left of Fig. 1.
Figure 4:
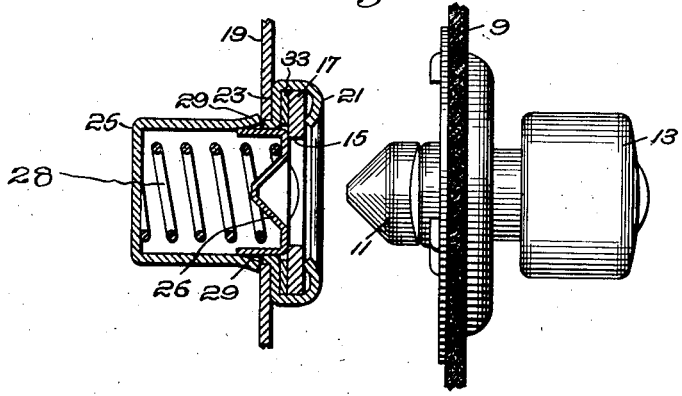
Fig. 4 is a section on the line 4—4 of Fig. 1 and illustrates also a cooperating fastener element in side elevation.

Referring to Fig. 4, I have there shown a separable fastener embodying as an element a double headed turnbutton secured to the curtain 9 and having at the inner side thereof the oblate cross-head 11 which may be turned by the button or head 13 at the outer side of the curtain and which is adapted to enter the oblate opening 15 of a cooperating socket member and be turned to engage behind the margins of the opening at the extremities of its minor axis. The opening 15 may be formed in a plate 17 which may be supported substantially flush with the outer surface of the metal body panel 19 of an automobile body and is herein held by the turned over edge 21 of an annular flange 23 formed at the extremity of a tubular socket 25 which is adapted to pass through a hole in the panel 19 and be secured therein. The socket 25 may accommodate the follower 26, normally pressed toward the right in the figure by the spring 28 and, when the parts are disengaged, closing opening 15 from the rear, the follower being displaced by the entering head 11 when the parts of the fastener are locked together. Referring now more particularly to Figs. 1 and 3, the body panel may be provided with a circular opening in which the tube 25 is adapted to fit and the margins of this opening may be provided, herein at diametrically opposed points, with extensions or notches 27 which herein are of generally rectangular form reminiscent of a keyway although obviously any asymmetrical extension or addition to the main hole might be utilized. The socket 25 is provided with suitable projections 29 on the sides thereof which are adapted to interlock the socket with the panel 19 by a bayonet joint. Herein the socket is inserted in the opening from the right, viewing Fig. 1, the projections 29 passing through the notches 27, and the socket is then turned to bring the projections behind the margin of the opening to the position shown in Figs. 1 and 3, the edge of the panel 19 being received between these projections and the flange 23. The projections 29 are herein formed as lugs struck outwardly from the sides of the socket 25 and disposed at a slight angle to the wall thereof. The ends of these lugs are preferably spaced from the inner face of the flange 23 (see Fig. 4) at a distance which is a few thousandths of an inch less than the nominal thickness of the plate 19 and the ends thereof are bevelled or rounded off, as best illustrated in Fig. 1. The bevelled ends permit them when rotated to ride over the margin of the notch 27 through which they have been introduced, drawing the socket rearwardly or toward the left, viewing Fig. 1, with a camming action and, while substantially stiff, the lugs may be sufficiently bent by the inserting operation to permit them to ride behind the back of the panel accommodating themselves to any slight variation in its thickness and clamping the flange 23 tightly against the outer face thereof. In this action they may be bent in a substantially axial direction but because of the slight angle which they make they are not sharply bent or their angularity materially altered in such a way as to permit the socket to lie loosely in the panel or to weaken the function of the lugs engaging the inner surface of the panel and resisting withdrawal of the socket under the ordinary strains of use.

Figure 2:
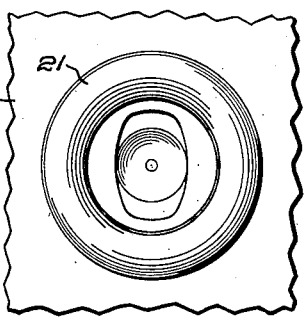
Fig. 2 is a front elevation thereof.
Figure 5:
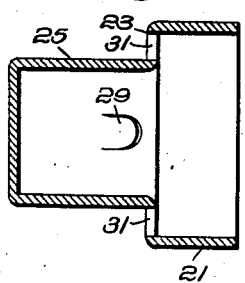
Fig. 5 is a longitudinal section through a body member utilized in the construction of the socket.
Figure 6:
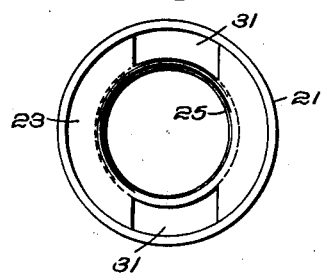
Fig. 6 is an elevation thereof as seen from the right of Fig. 5.
Figure 7:
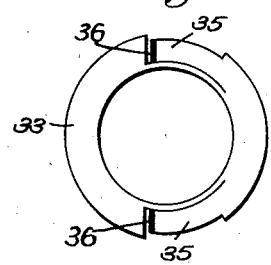
Fig. 7 is a plan of a washer which enters into the construction of the device.

Preferably means are provided whereby the bayonet joint connection between the socket and the panel 19 may be locked and I have herein disclosed means which will effectually resist turning of the socket after it has been brought to the position of Figs. 1 and 3 and which may also act to define and maintain the angular orientation thereof so that the asymmetrical opening 15 (see Fig. 4) will be disposed in a desired angular position on the work. While locking means of widely different mechanical constructions might be provided, I have herein shown the flange 23 as provided (see Figs. 5 and 6, which show the shell of the body before assembly of the parts by curling over of the end 21) with openings 31 conveniently disposed at 90° spacing from the projections 29 through which openings suitable detents may project to engage the notches 27. I have herein shown as received beneath the plate 17 a washer 33, shown in plan in Fig. 7, which carries spring tongues 35 adapted normally to extend through the holes 31 to the position shown in Fig. 1, thus to permit them to enter the notches 27 and to engage the margins thereof. When the socket is assembled with the panel 19 and the projections 29 are passed through the rear of the panel, these tongues 35 are compressed toward the right in Fig. 1 to a position inwardly of the rearward face of the flange 23 but when the socket is turned to the position of Figs. 1, 2 and 3 and the tongues come opposite the notches 27, they snap outwardly and engage the margins thereof. Herein the ends of these tongues present substantially radial shoulders 36 to interlock with the margins of the notches and. as shown in Fig. 7, these shoulders 36 point in the same direction or in opposite rotative senses so that the socket is thereby completely locked against turning. Thus, considering Fig. 7 as if viewed from the front of the socket, if the latter tends to be turned clockwise, the lower tongue 35 will prevent such movement while counterclockwise turning is checked by the upper tongue. Since the washer 33 has no parts exposed in the completed fastener, it may conveniently be made from steel, thus providing for ample strength and resiliency in the tongues 35.

I have described in detail the particular embodiment of my invention shown by way of example in the accompanying drawings. Obviously the mechanical structure might be widely varied without departing from the principles exemplified by this disclosure. The detailed character of the description is therefore not to be understood as in any way definitive of the scope of the invention. What I do claim and desire to secure by Letters Patent I shall express in the following claims.

Claims:

1. A separable fastener element having a body to enter a support for the same and a flange to overlie the face of the support, means on said body to interlock with the support on turning movement of said element and a detent projecting from the inner face of the flange and having a shoulder for engagement with the support to resist turning.

2. A separable fastener element having a body to enter a supporting element for the same and an annular flange to overlie the face thereof, said annular flange being apertured, and a support-engaging spring tongue assembled as a part of the fastener element and projecting through the aperture in said annular flange and having a substantially radial shoulder to engage the support to resist turning.

3. A separable fastener element having a body to enter a supporting element for the same and an annular flange to overlie the face thereof, said annular flange being apertured at opposite points, and support-engaging spring tongues assembled as a part of the fastener element and projecting through the apertures in said annular flange and having substantially radial shoulders presented in the same direction to engage the support to resist turning.

4. A separable fastener element comprising a hollow body having an annular flange at one end, an opening in the flange, a ring resting on the flange, the edge of the flange being turned over to retain the ring and a spring tongue cut from the ring to project through said opening and means provided as a part of the fastener element for cooperation with the flange to secure the fastener element to a support.

5. A separable fastener element comprising a body having an annular flange at one end, means carried by the body and opposing the flange to hold a supporting member thereagainst and a spring tongue assembled at a part of the fastener element and projecting from the inner side of the flange and having a substantially radial shoulder carried thereby for locking the fastener element against rotation with relation to the supporting member.

6. In a fastener installation in combination with a wall having an opening provided with notches at spaced points, a separable fastener element received in the opening having projections carried thereby to pass through the notches and be turned behind the wall, and detents also carried by the fastener element and having shoulders extending in the same direction to engage the margins of the notches after turning.

7. A separable fastener element comprising a cylindrical body having a terminal flange, projections struck from the body and opposing the flange, there being an opening in the flange between the projections, and a member held against the flange having a spring tongue to project through the opening.

8. A separable fastener element comprising a cylindrical body having a terminal flange, projections struck from the body and opposing the flange, there being an opening in the flange between the projections, and a ring overlying the flange having a spring tongue cut therefrom to project through the opening, the flange being crimped over the ring to retain the same.

9. In a fastener installation in combination with a wall having an opening with a notch, a separable fastener element having a projection adapted to pass through the notch and be turned behind the wall adjacent thereto, said element also carrying a detent to enter the notch after turning.

10. In a fastener installation in combination with a wall having an opening provided with notches at separated points, a separable fastener element having a body to enter the opening and a flange to overlie the face of the wall, said body having projections to pass through the notches and be turned behind the wall, and said flange having detents to enter the notches after turning.

11. In a fastener installation in combination with a wall having an opening provided with notches at separated points, a separable fastener element having a body to enter the opening and an annular flange to overlie the face of the wall, said body having projections to pass through the notches and be turned behind the wall, and said annular flange having detents in the form of spring tongues having substantially radial shoulders to engage the margin of the notches after turning, said shoulders extending in the same direction.

12. In a fastener installation in combination with a wall having an opening provided with notches, a separable fastener element having a part entering the opening and an annular part overlying the notches, means to retain the element in the opening and means to resist turning thereof comprising spring tongues carried by the annular part and having substantially radial shoulders to engage the wall at the margins of said notches, said shoulders extending in the same direction.

13. In a fastener installation, in combination, a support having an opening with a notched margin, a separable fastener element to be received in said opening having a projection to enter the notch and engage with the support by a bayonet joint connection on turning movement, said element also having a detent for engagement with a margin of the notch after the turning to lock the connection.

14. In a fastener socket installation, in combination, a support having an opening with a notched margin, a separable fastener socket having a hollow body to enter the opening and a flange to overlie the support, said body having projections adapted to pass through the notches and to be turned behind the support, said projections having bevelled ends presented toward the flange and being capable of slight axial displacement.

15. In a fastener installation, in combination, a support having an opening with a notched margin, a separable fastener element having a body to enter the opening and a flange to overlie the support, said body having lugs struck therefrom to extend at a slight angle to the body toward the flange forming projections adapted to pass through the notches and to be turned behind the support, said lugs having bevelled ends.

In testimony whereof, I have signed my name to this specification.

EMILE F. LEMOINE.